Figure 1:
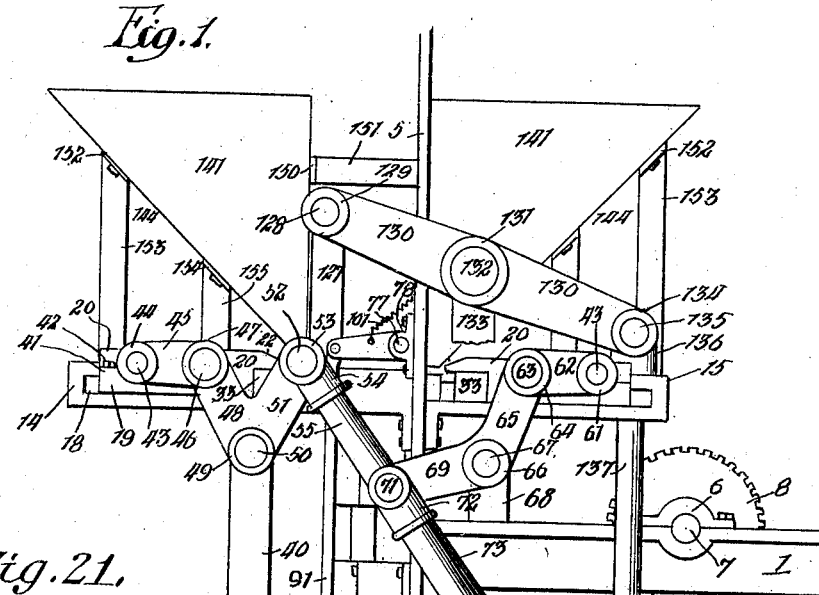

J. M. DENNING.
WIRE FENCE MAKING MACHINE.
APPLICATION FILED JUNE 18, 1908.

980,499.

Patented Jan. 3, 1911.

6 SHEETS—SHEET 1.

Witnesses:

Inventor:

J. M. DENNING.
WIRE FENCE MAKING MACHINE.
APPLICATION FILED JUNE 18, 1908.
980,499.
Patented Jan. 3, 1911.
6 SHEETS—SHEET 3.
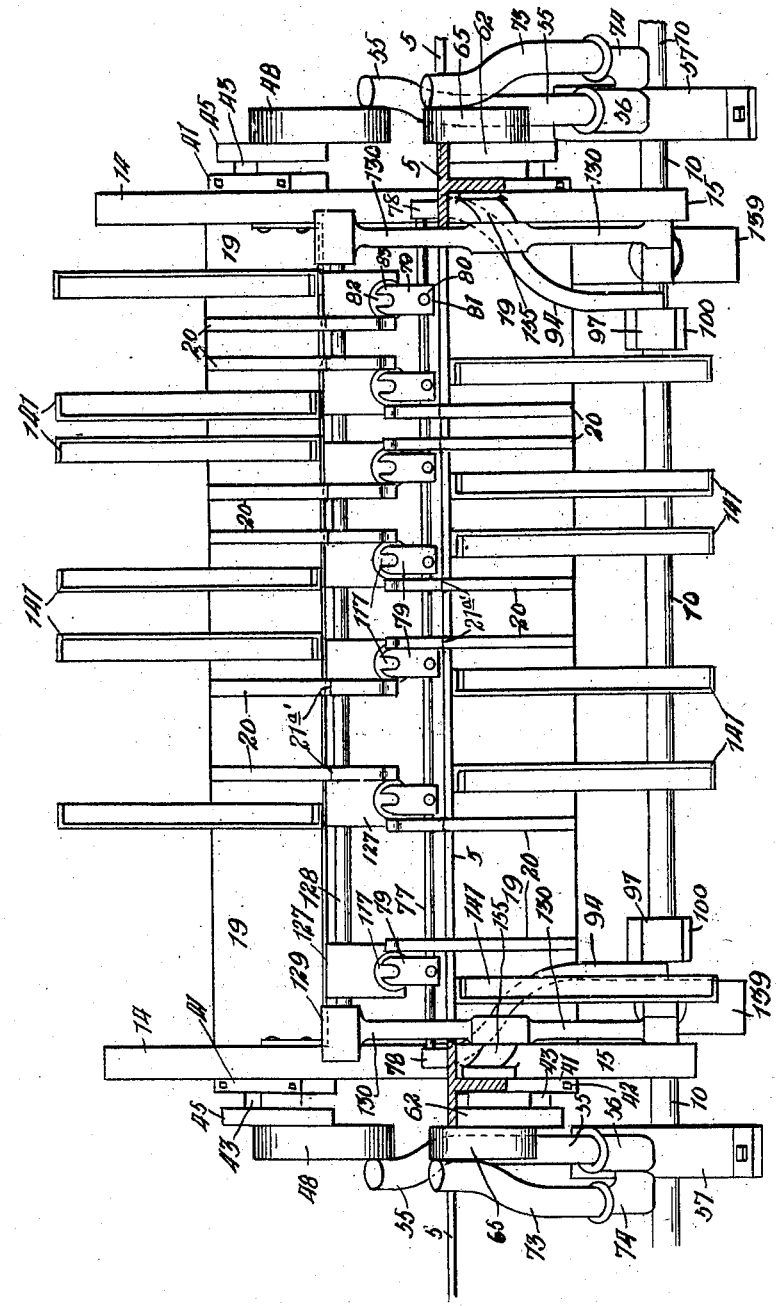
Witnesses:
Wm P. Bond
Pirrson W. Banning
Inventor:
Joseph M. Denning
by Charles O. Sherrey
Atty.

J. M. DENNING.
WIRE FENCE MAKING MACHINE.
APPLICATION FILED JUNE 18, 1908.
980,499.
Patented Jan. 3, 1911.
6 SHEETS—SHEET 4.
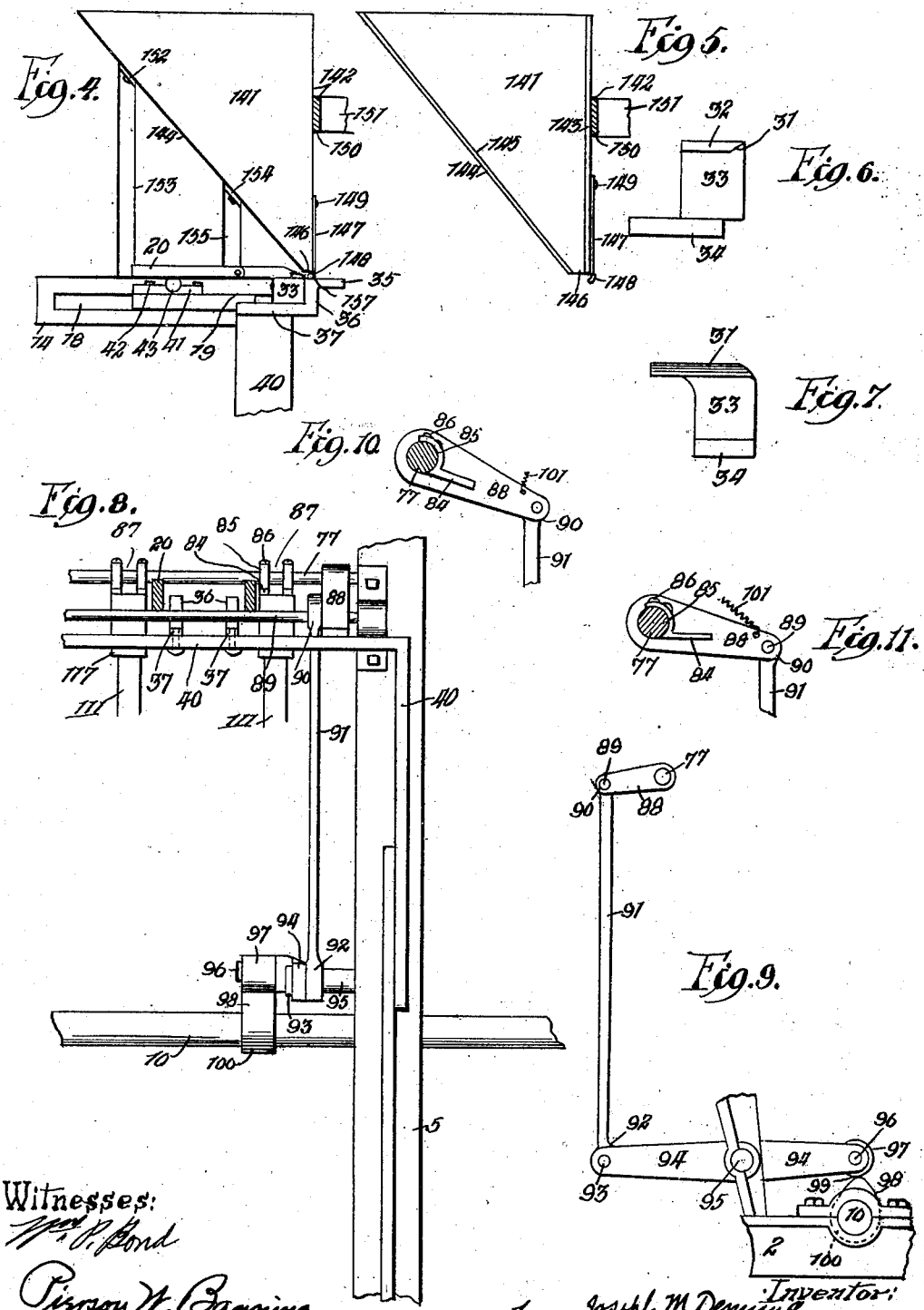

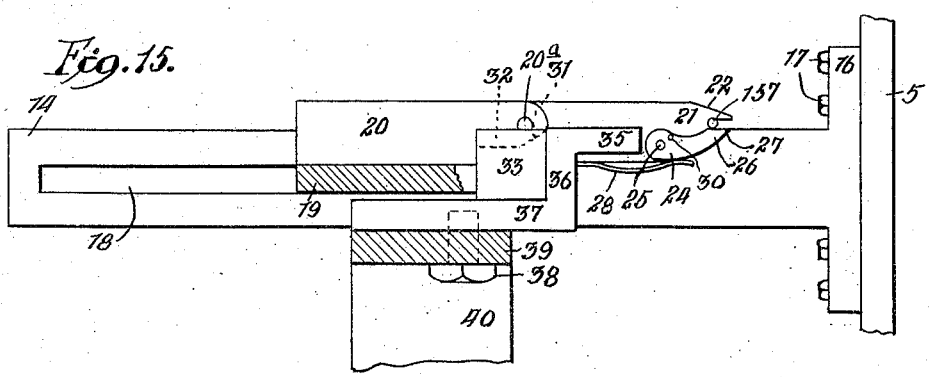
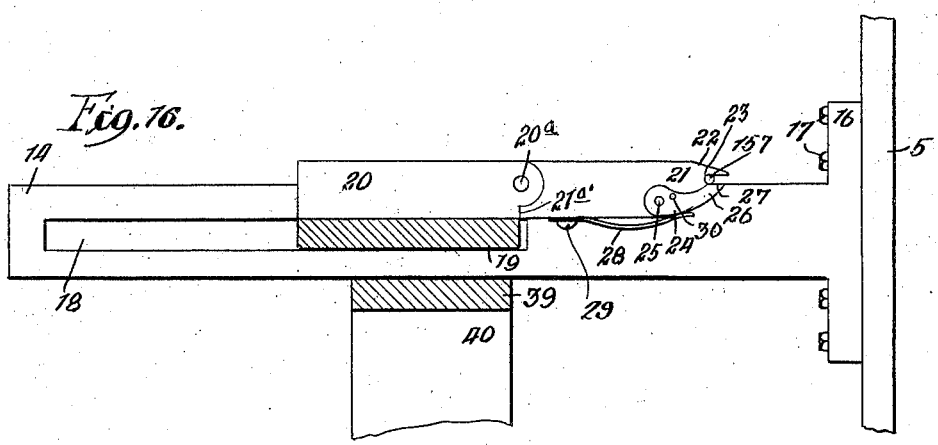
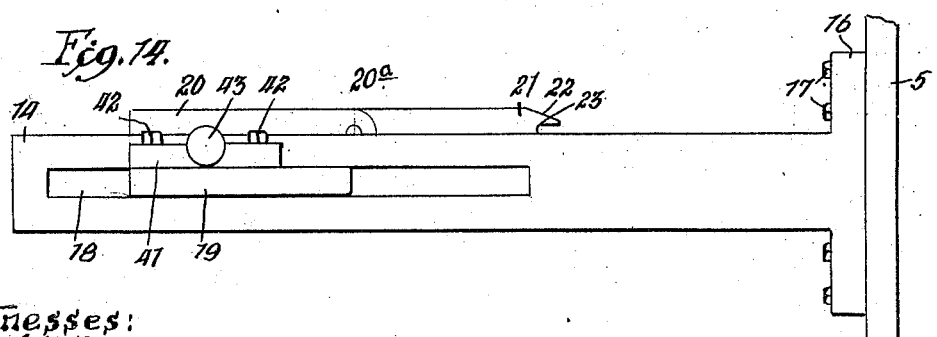

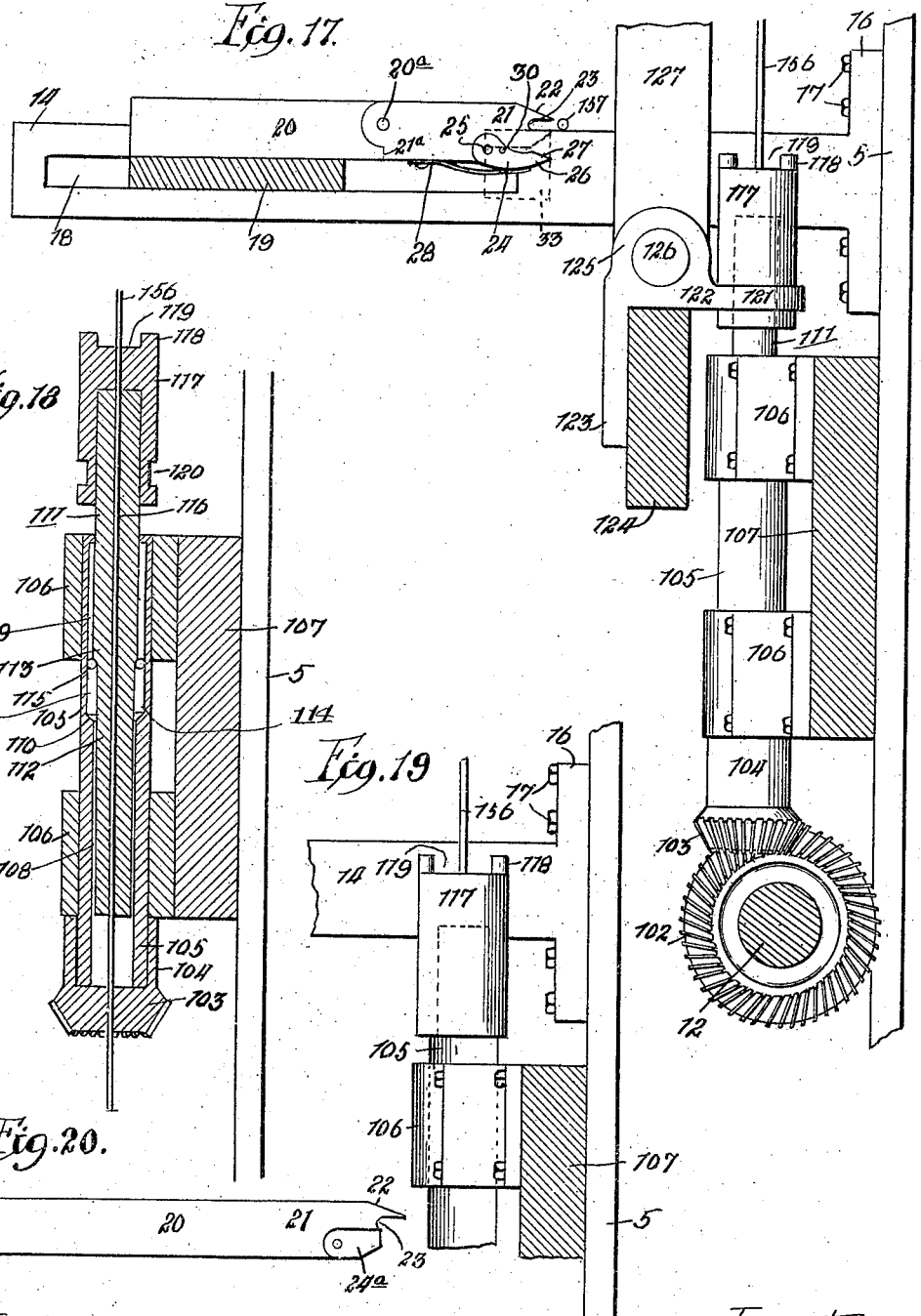

UNITED STATES PATENT OFFICE.

JOSEPH M. DENNING, OF CEDAR RAPIDS, IOWA.

WIRE-FENCE-MAKING MACHINE.

980,499.  Specification of Letters Patent.  Patented Jan. 3, 1911.

Application filed June 18, 1908. Serial No. 439,207.

*To all whom it may concern:*

Be it known that I, JOSEPH M. DENNING, a citizen of the United States, residing at Cedar Rapids, in the county of Linn and State of Iowa, have invented certain new and useful Improvements in Machines for Making Wire Fences, of which the following is a specification.

The present invention relates to machines for making wire fence of the type of fence employing longitudinal or strand wires and sectional stay wires, with the overlapping ends of the stay sections coiled or wound around the adjacent longitudinal or strand wires.

The objects of the present invention are to deliver previously formed stay sections, from hoppers containing the same, into position adjacent to the longitudinal or strand wires, and over or across the ends of the coilers, so that the coilers will act and wind or coil the ends of the stay sections around the strand wires; to arrange a plurality of hoppers of different widths to receive stay sections of different lengths for the varying spaces between the strand wires, and locating, in correlation with the delivery mouth of each hopper fingers or plungers having a reciprocating movement, and by means of which the stay sections are advanced or carried forward into position adjacent to the longitudinal or strand wires and over the coiler heads; to furnish a plurality of delivery fingers or plungers mounted on a common bar having a reciprocating movement forward and back, each plunger or finger having a notched advanced end, constituting a fixed jaw, and a movable jaw pivotally mounted on the body of the plunger or finger and adapted to be opened and closed for receiving the stay section and carrying the same forward for delivery; to construct a plunger or finger for delivering a stay section into position adjacent to the longitudinal or strand wire and over a coiler head, said plunger or finger having, at its forward end, a point with a notch forming a fixed jaw coöperating with a movable jaw pivotally mounted on the body of the finger or plunger and adapted to be opened and closed with the reciprocating movement of the finger or plunger; to provide a pin on the movable jaw of each finger or plunger coöperating with a fixed cam for opening the jaw at the termination of the receding movement; to provide a spring engaging the movable jaw of the finger or plunger and operating to close the jaw with the initial advance of the finger or plunger and hold the stay section between the two jaws; to mount a plurality of fingers or plungers, for advancing a stay section into position adjacent to the longitudinal or strand wire and over the coiler heads, by means of a bar common to all of the fingers or plungers and given a reciprocating movement forward and backward by means of a pitman actuated from an eccentric; to locate a plurality of fingers or plungers for advancing stay sections in position on opposite sides of the strand wires and over the coiler heads, each row of the fingers or plungers mounted on a common reciprocating bar, and each reciprocating bar advanced and receded through the medium of a pitman and an eccentric; to locate a plurality of plungers or fingers on opposite sides of the longitudinal or strand wires, each row of plungers or fingers adapted to advance alternate sections of the stay into position adjacent to and on opposite sides of the longitudinal or strand wires and over the coiler heads, each row of fingers or plungers carried by a reciprocating bar, and means for advancing and receding each bar independently and in unison; to furnish a plurality of fingers for forcing down and holding in position, over the coiler heads, the sections of the stay, after the delivery of the same by the fingers or plungers; to furnish a plurality of fingers arranged in series on opposite sides of the longitudinal or strand wires and operating to force down and hold in position the ends of the stay sections, after the delivery of the same into position by the fingers or plungers; to provide a plurality of fingers or plungers for advancing the stay sections into position adjacent to the longitudinal or strand wires and over the coiler heads, and a plurality of fingers for forcing and holding down the ends of the stay sections, after the delivery of the sections by the fingers or plungers; to provide a plurality of reciprocating fingers or plungers arranged in series on opposite sides of the longitudinal or strand wires for delivering alternate sections of the stay into position on opposite sides of the longitudinal or strand wires, and a plurality of fingers arranged in series on the same side of the longitudinal or strand wires for forcing and holding down the delivered sections of the stay; and to improve generally the construction and operation of the various elements and mechanisms entering into the formation of the machine as a whole.

The invention consists in the features of construction and combinations of parts hereinafter described and pointed out in the claims as new.

Figure 21:
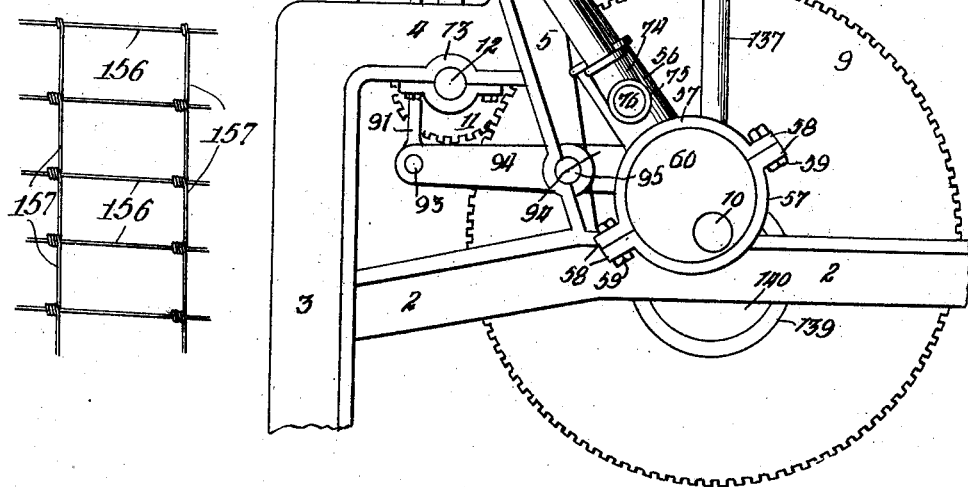
Figure 12:
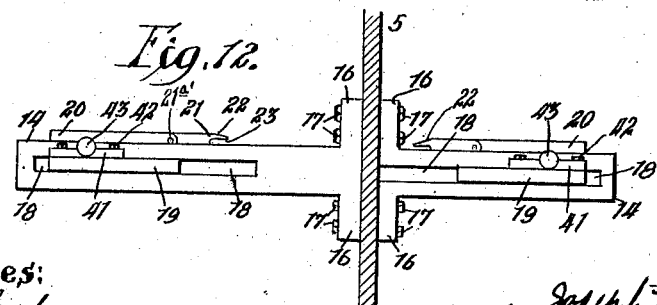
Figure 2:
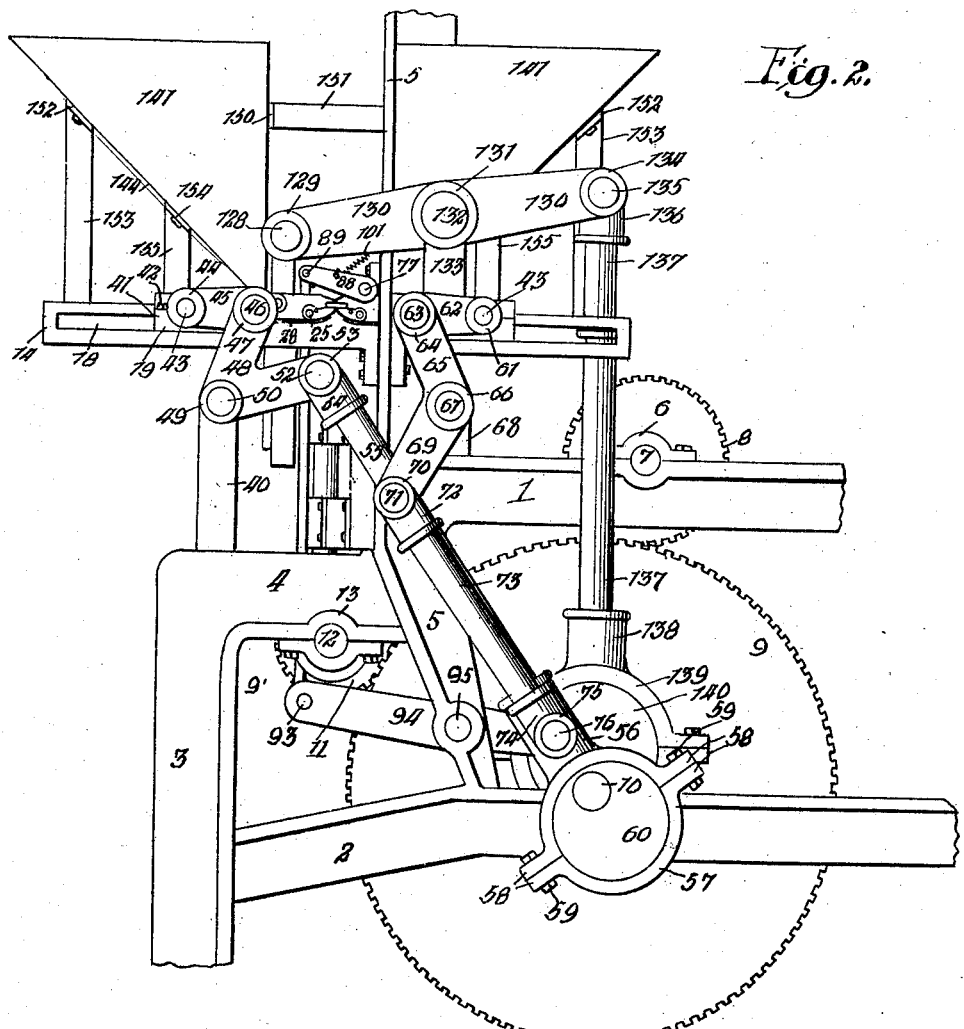
Figure 13:
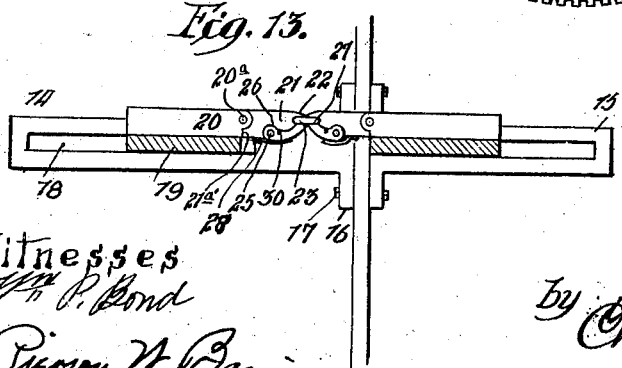

In the drawings illustrating the invention Figure 1 is a side elevation, showing the delivery fingers in their receded position and the coiler heads at the commencement of the coiling or connecting of the ends of the stay sections around the longitudinal or strand wires; Fig. 2 a similar view to Fig. 1, showing the delivery fingers advanced for delivering the stay sections into position adjacent to the longitudinal or strand wires, with the coiler heads depressed or in their nonacting position; Fig. 3 a top or plan view, with the delivery fingers in the position shown in Fig. 2; Fig. 4 a side elevation of a hopper containing the stay sections, with the delivery fingers in position to receive a stay section; Fig. 5 an elevation of the inside of one of the ends of a hopper; Fig. 6 a detail, showing a face view of the track or cam for opening the movable jaw of the delivery finger or plunger; Fig. 7 a detail in elevation of the cam or track of Fig. 6, showing the overhang of the same; Fig. 8 a detail in elevation, showing the fingers and the operating means therefor by which the ends of the stay sections are forced down into engaging position for the coiler heads; Fig. 9 a detail in side elevation of the parts shown in Fig. 8; Fig. 10 a detail, in side elevation and partly in section, showing the depressed position of the fingers for forcing down and holding the ends of the stay sections in position for the operation of the coiler heads; Fig. 11 a similar view to Fig. 10, showing the fingers in their elevated position; Fig. 12 a detail, being a side elevation, showing the delivery fingers or plungers for the stay sections in receded position; Fig. 13 a similar view to Fig. 12, showing the fingers or plungers in advanced position; Fig. 14 a side elevation on an enlarged scale as compared with Fig. 12, showing one of the delivery fingers or plungers in receded position; Fig. 15 a similar view to Fig. 14, partly in section, showing the delivery fingers or plungers in advanced position, and showing the support for the stay sections and the cam or track for opening the movable jaw of the finger or plunger; Fig. 16 a similar view to Fig. 15, with the stay section support and the cam or track for opening the movable jaw of the finger or plunger removed; Fig. 17 an elevation, partly in section, showing the normal position of the delivery fingers or plungers, the fingers for forcing down the ends of the stay sections and the coiler head; Fig. 18 a sectional elevation of the coiler head and shaft of Fig. 17; Fig. 19 a side elevation similar to Fig. 17, showing a fixed coiler head instead of a reciprocating coiler head; Fig. 20 a side elevation of a delivery finger or plunger having the body and point continuous for use with coilers having a fixed relation and longitudinal or strand wires having an intermittent forward feed, and Fig. 21, a detail showing the construction of fence fabric made by the machine, Figs. 14, 15 and 16 showing a construction of delivery finger or plunger having a pivoted point for use with coiler heads having an end movement, and longitudinal or strand wires having a continuous forward feed.

The machine, in the construction shown, has two side frames, which frames, however, are not fully shown, and are substantially like the side frames shown in my Letters Patent of the United States, No. 816,538, dated March 27, 1906. Each side frame has an upper cross bar 1, a lower cross bar 2, end uprights or standards 3, terminating in a horizontal end or bar 4, and an upright or vertical bar 5, extending from the lower cross bar 2 and having united therewith the upper cross bar 1 and end bar 4, as shown in Figs. 1 and 2. The parts so far described are duplicated for each side frame, and each upper cross bar 1 has thereon a journal box or bearing 6 in which is mounted a main driving shaft 7, having fixedly mounted thereon, adjacent to each side bar, a gear 8, which meshes with a gear 9 fixedly mounted on a shaft 10 for revolving the shaft. The gears 9 mesh with gears 11 on a shaft 12, mounted in suitable journal boxes or bearings 13 on the under side of the upper end bar 4 of the frame, as shown in Figs. 1 and 2.

A guide 14 extends laterally or horizontally from one side of each vertical or upright bar or post 5; and a guide 15 extends laterally or horizontally from each vertical bar or standard 5 of the frame. The two guides 14 and 15 are located in the same horizontal plane, and each guide, at its inner end, has ears 16, by means of which and suitable bolts 17, the guides are attached to the vertical post or standard 5, as shown in Figs. 12 and 13. Each guide 14 and 15 has therein a longitudinal slot 18, which slots receive a bar 19, which is given a forward and backward reciprocating movement. Each bar 19 has mounted thereon a plurality of fingers or plungers 20, and each finger or plunger 20, at its forward end, has a point 21 with an inclined upper face 22 and a slot or recess 23, which slot or recess receives the stay section. The forward end or point 21, with its slot 23, constitutes a fixed jaw, coacting with which is a movable jaw 24 entered into a recess 24$^a$ of the point 21 and, attached to the body of the finger or plunger 20 by a pin or pivot 25, and having, at its forward end, a point 26 with a flat face 27, completing the slot or recess 23, when the movable jaw 24 is closed. The movable jaw is held in its closed position by a flat spring 28, the free end of which bears against the under face of the movable jaw; and each spring 28 is attached by a set screw 29, or otherwise, to the under face of the finger or plunger. The movable jaw 24 of each finger or plunger has a projecting pin 30, which, as the finger or plunger is receded, engages the inclined face 31 of a cam or track 32, so as to throw open the movable jaw, for the finger or plunger to receive into the slot or recess 23 the deposited stay section. A cam or track 32 is located adjacent to each finger or plunger 20, so as to engage the pin 30 of the movable jaw of the finger or plunger and open such jaw at the terminus of the receding movement of the finger or plunger; and each cam or track 32 is carried by an upright plate or support 33 extending up from an ear 34 attached by a screw, or otherwise, to a cross support or bar.

A rest or support 35 is located adjacent to each side of each finger or plunger, and the rests or supports receive the stay sections, as they drop from the hoppers when the fingers or plungers are receded; and, as shown, the upper face of the rests or supports 35 are in the plane of the face 27 of the movable jaw of each finger or plunger when closed, so that the upper face of the rests or supports 35 completes the slot or recess 23, when the fingers or plungers are receded. Each rest or support 35 extends forwardly from a standard or post 36, extending upwardly from a base or plate 37 attached by lag bolts 38, or otherwise, to a cross-bar 39 at the upper end of vertical bars 40, attached to the horizontal bar 4 of the main frame, or otherwise secured in position; and this cross-bar 39 has attached thereto, by lag bolts, or otherwise, the ears 34 of the cams or tracks 32 by means of which the movable jaws of the fingers or plungers are opened.

A plate 41 is attached by bolts 42, or otherwise, to the projecting ends of each sliding bar 19, and each plate 41 carries a pin or pivot 43, which receives a bearing 44 at the end of a link 45, the other end of which link receives a pin or pivot 46, mounted in a bearing 47 on the end of an arm or member 48 of a bell crank lever. The bell crank lever has a bearing 49 which receives a pin or stud 50, extending out from the upright bar or post 40, so that the bell crank lever is free to oscillate on the pin or stud. The other arm or member 51 of the bell crank lever carries a pin or stud 52, which enters a bearing 53 on a socket 54 secured to the end of a pitman or rod 55, the other end of which pitman or rod is secured in a socket 56 of a ring encircling an eccentric. The ring is formed of two half rings or sections 57, each having ears 58, by means of which and suitable bolts 59 the ring is entered onto and encircles an eccentric 60, fixedly mounted on the shaft 10, so that, as the shaft 10 revolves the eccentric 60 will be revolved, and, through the pitman or rod 55 and the bell crank lever having the arms 48 and 51, give the plate 19 of the guide 14, a forward and backward reciprocating movement by which the fingers or plungers, carried by the plate 19 of the guides 14, will be advanced to deliver the stay sections in position adjacent to the longitudinal or strand wires and over the coiler heads and will be receded to receive a new set of stay sections.

The pin or pivot 43 of the plate 19 supported by the guides 15 has entered thereonto a bearing 61 at the end of a link 62, the other end of the link having a pin or stud 63, which enters a bearing 64 on the end of an arm or member 65 of a bell crank lever. The bell crank lever has a bearing 66 mounted on a pin or stud 67 projecting out from a post or upright 68, attached to the cross bar 1, or otherwise secured in position. The other arm or member 69 of the bell crank lever has a bearing 70, entered onto a pin or stud 71 of a socket 72 attached to the upper end of a pitman or rod 73, and the other end of the pitman or rod 73 is entered into a socket 74, having a bearing 75 mounted on a pin 76 projecting out from the socket 56, so that the revolving of the eccentric 60 will, through the pitman or rod 73, and the bell crank lever having the arms 65 and 69, give the plate 19 of the guides 15 a forward and backward reciprocating movement, by which the fingers or plungers 20 carried by the plate 19 of the guides 15, will be advanced to deliver the stay sections in position adjacent to the longitudinal or strand wires and will be receded to receive another set of stay sections. It will be seen that the fingers or plungers 20 are arranged in two series on opposite sides of the coiler heads; and that the fingers or plungers of each series will be given a simultaneous forward movement for delivering the stay sections and a simultaneous receding movement to receive a new set of stay sections.

A cross shaft 77, mounted in suitable journal boxes or bearings 78 on the vertical bars or uprights 5, extends across the machine, and this cross shaft 77, in the arrangement shown in Fig. 3, has mounted thereon a plurality of fingers, corresponding in number to the number of the longitudinal or strand wires. Each finger has a body or member 79, with a curved plate 80, which partially encircles the shaft 77 and is secured thereto by a set screw 81, or otherwise. Each plate or member 79, at its forward end, has a slot or recess 82 to straddle the longitudinal or strand wires, with a point 83 on each side of the slot to engage the overlapping ends of the stay sections adjacent to a longitudinal or strand wire, and hold the overlapping ends of the stay sections, after the delivery of the stay sections in position on opposite sides of the longitudinal or strand wires.

The construction shown in Fig. 8, instead of having a finger formed of a single plate with a slotted end, has each finger formed in two parts, each part having a member 84 with a circular end 85, attached by a set screw 86, or otherwise, to the cross rod or shaft 77, so as to leave a space 87 between the two parts of the finger to straddle the longitudinal or strand wire, for the ends of the members 84 to engage the overlapping ends of the stay sections and hold the stay sections in position, after the delivery of the same by the reciprocating plungers or fingers.

The cross shaft or rod 77, adjacent to each end thereof, has an arm or crank 88 to which is attached, by a pin or pivot 89, an eye or loop 90 of a connecting rod or pitman 91, having, at its lower end, an eye or loop 92 which receives a pin or pivot 93 on one end of a walking beam or lever 94, which is mounted on a pin or stud 95 extending out from the upright or standard 5, above the cross bar 2 of the frame, as shown in Figs. 8 and 9. The opposite end of the walking beam or lever 94 has a pin or stud 96, on which is mounted a roller 97 located in the line of a revolving cam, which cam has an inclined face 98 and an upright face 99 slightly inclined, as shown in Fig. 9; and the projection of the cam, having the faces 98 and 99, is carried by a sleeve or collar 100, fixedly attached to the shaft 10, so that, as the shaft 10 revolves the cam on the collar or sleeve 100 will engage the roller 97 and raise the end of the walking beam or lever 94 at the roller end, depressing the lever or walking beam 94 at the opposite end, and, through the connecting rod or pitman 91, carry down the pivot 89, and with it the end of the arm or crank 88, for the descent of the arms or cranks 88 to rock the shaft or rod 77 and carry down the retaining fingers mounted on the rod or shaft, holding the stay sections in position for the initial operation of the coilers. The construction shown has attached to each arm or crank 88 one end of a coil spring 101, the other end of which is attached to the standard or upright 5, which springs operate to return the arms or cranks to normal position, giving a reverse rock to the shaft or rod 77 and raising the retaining fingers into normal position, clear of the attached stays and out of the way of the stays as the completed fabric or fence is advanced. The construction shown has, on the shaft 12, a plurality of beveled gears 102, corresponding in number to the number of longitudinal or strand wires. Each wheel 102 meshes with a bevel pinion 103, the hub 104 of which is fixedly attached to a hollow shaft or sleeve 105, which is mounted in suitable journal boxes or bearings 106 attached to a cross bar 107, which can be secured, at its ends, to the side frames of the machine. The hollow shaft or sleeve 105 has a central longitudinal bore 108, extending partially therethrough and an enlarged bore 109 forming a continuation of the bore 108; the bore extending, from end to end of the shaft or sleeve, with a bearing flange at the upper end of the larger bore, as shown in Fig. 18. The section 109 of the central bore terminates, at its lower end, in a bevel shoulder 110, and the longitudinal bore, as a whole, has entered thereinto a shaft or stem, having an upper section 111 and a lower section 112 of a less diameter than the upper section; and at the juncture of the two sections is a beveled shoulder 113, between which, and the shoulder 110, is a recess or chamber 114, which receives stops 115, for limiting the reciprocating movement of the shaft or stem within the hollow shaft or sleeve. The central shaft or stem has a longitudinal bore 116 in line with a bore or hole in the driving pinion, and also in line with a bore or hole in the coiler head 117, which is fixedly secured to the upper end of the section 111 of the reciprocating shaft or stem. The coiler head, on its acting end, has lugs or pins 118, with a space 119 on each side of the central hole or bore, which spaces 119 receive thereinto the ends of the stay sections to be coiled around the longitudinal or strand wire, which passes upwardly through the central bore 116 of the coiler shaft or stem.

The construction of coiler head and driving means therefor, shown in Figs. 17 and 18, is for use with longitudinal or strand wires having a continuous feed, and for this purpose the coiler head must advance in unison with the advance of the longitudinal or strand wires passing therethrough. The coiler head, adjacent to its lower end, has an annular or circumferential slot 120, which receives an eye or fork 121 on the end of a plate having a longitudinal portion 122, and a vertical portion 123, and supported by a vertically movable cross bar 124, so that, with the upward movement of the cross bar 124, the row of coiler heads will be simultaneously raised, and with the descent of the bar 124 all of the coiler heads will simultaneously descend to normal or non-acting position. The cross bar 124 has, at each end, an eye or bearing 125 into which is entered a pivot or stud 126 on the lower end of a connecting bar 127 upwardly extending and having, at the upper end, a stud or pin 128, which enters a bearing 129, on a lever or walking beam 130, at the center of which is a bearing 131 into which is entered a pin or stud 132 on a post or standard 133, upwardly extending from a guide 15 in the arrangement shown. The other end of the lever or walking beam 130 has a bearing 134, which receives a pin or stud 135 on a socket 136 at the upper end of a connecting rod or pitman 137, which is entered into a socket 138 of a ring 139, encircling an eccentric 140 fixedly mounted on the shaft 10, so that, as the shaft 10 revolves rotation will be given to the eccentric 140, and, through the connecting rod or pitman 137, operate the lever or walking beam 130 for the bar or strap 127 to raise the cross bar 124 and simultaneously raise all of the coiler heads for the coiling pins or lugs 118 to engage the overlapping ends of the stay sections and coil such ends around the adjacent longitudinal or strand wire. The upward movement of the coiler heads will continue until the coiling of the stay section ends is finished, at which time the eccentric will give a reverse movement to the rocking lever or walking beam, forcing the cross bar 124 down, through the connecting rod or pitman 137 and the bar or plate 127, returning the coiler to normal or nonacting position.

The reciprocating coiler heads are only required for use in case the longitudinal or strand wires have a continuous advance; and where the longitudinal or strand wires are intermittently advanced the coiler heads 117 need not have an end movement; and for this construction the coiler head 117 can be attached directly to the shaft or sleeve 105, omitting the intermediate or central shaft or stem. The arrangement for a fixed coiler head is shown in Fig. 19, and it will be understood that with a single shaft 105, such shaft is to have a longitudinal hole or bore 116 for the passage of the longitudinal or strand wire. The location of the coiler head, whether endwise movable or having a fixed relation, when in normal position, is shown in Figs. 17 and 19, in relation to the position of the delivery fingers or plungers and the fingers or plungers for forcing the overlapping ends of the stay sections into engaging position for the coiling pins or lugs; and it is to be understood that the coiler head can be of any suitable construction and located in such relation to the delivery plungers or fingers and the forcing down fingers, as to permit of the delivery of the stay sections over the acting end of the coiler and the pressing of the overlapping ends of the stay sections into engaging position for the coilers. The previously formed stay sections, cut of the required length to span the spaces between the longitudinal or strand wires, are placed in separate hoppers of the necessary width to receive the length of stay sections. The hoppers for the stay sections, in the arrangement shown in Figs. 1, 2 and 3, are located on opposite sides of the longitudinal or strand wires, and are arranged so as to receive the alternate lengths of stay sections for delivery to the longitudinal or strand wires. The hoppers shown each consists of an end wall 141, made of sheet metal or other suitable material and having a front wall 142, formed by an inturned flange 143 and an inclined rear wall 144 formed by an inturned flange 145, with an open space between the flanges of the two end walls forming the hopper, thereby decreasing the frictional contact of the stay sections, as the sections are only engaged at their ends with the inturned flanges. The front and rear walls, at the bottom, leave a space or opening 146, between the flanges 143 and 145, which is of sufficient width to allow a stay section to pass therethrough and be received by the rests or supports 35, when the delivery plungers or fingers are in receded position; and, as shown, flat springs 147 having a curved lower end 148 and attached by a rivet 149, or otherwise, to the front flange 143 of each end wall, serve as a stop to prevent the dropped section from advancing until caught in the slots or recesses of the two fingers or plungers, by which the section of stay is delivered to the longitudinal or strand wires. The plurality of hoppers on the left-hand side of the machine, in the arrangement of Figs. 1 and 2, are supported by a cross bar 150 having, at each end, a bar 151 attached in any suitable manner to the upright or standard 5; and the hoppers are still further supported on the rear side by a cross bar 152 having end standard 153 attached to the guide 14, and a cross bar 154 having end standards 155 attached to the end guide. The series of hoppers for the right-hand side of the machine, as shown in Figs. 1 and 2, can have their straight faces attached to a cross bar 150 secured to the uprights or standards 5, and by rear bars 152 and 154, as described for the support of the hoppers on the left-hand side of Figs. 1 and 2.

The operation will be understood from the foregoing description, but briefly is as follows: The complete machine is to have a carrying cylinder, such as shown in my Patent No. 816,538, or other suitable means for advancing the longitudinal or strand wires and the completed fence. The strand wires 156 are threaded through the coiler shafts and heads and the leading end of each longitudinal or strand wire is engaged with the carrier or other feeding device; and the sections for the transverse stays 157 are placed in the respective hoppers therefor, so that a hopper will discharge through its throat or mouth a single stay section. The machine, at the start of the operation, has the delivery plungers or fingers at the limit of the backward or receded movement, with the forcing down fingers raised and the coiler heads in their normal position, and the stay section from each hopper in position on the rests 35, so that with the initial advance of the fingers or plungers the stay section will enter the slot or recess 23 of each plunger or finger, a pair of plungers or fingers being provided for each stay section. The fingers or plungers continue their advance movement, each pair carrying a stay section; and the stay sections, with the construction shown, are delivered to the longitudinal or strand wires on opposite sides thereof, with the ends of the stay sections overlapping the longitudinal or strand wires adjacent thereto. At the cessation of the advance movement of the delivery plungers or fingers the forcing down fingers are carried down, so as to engage the overlapping ends of the stay sections, and the coiler heads are advanced into position for the action of the depressing or forcing down fingers to carry the ends of the stay sections into position to be caught by the coiling pins or lugs of the coiler. The coilers, as each coiler revolves, engage and coil or wind the overlapping ends of the stay sections around the strand wires, and the upward movement of the coiler heads is coincident with the upward travel of the longitudinal or strand wires; and as the coiler heads move upward the depressing or forcing down fingers are elevated and clear the transverse stay, after the coiler heads have made the initial turn or twist of the overlapping ends around the longitudinal or strand wires, thus leaving a perfect clearance for the advance of the longitudinal or strand wires and the completed fence. The delivery fingers or plungers, during the coiling operation, have been returned to their normal or receiving position for each pair of plungers or fingers to receive a new stay section, and with the next advance of the plungers or fingers the coiler heads are returned to their normal position, so that the new set of stay sections can be delivered in position adjacent to the longitudinal or strand wires and over the coiler heads, for the depressing or forcing down fingers to act and hold the overlapping ends of the stay sections, until such ends are caught with the next advance of the coiler heads and the ends of the stay sections coiled or wound around the longitudinal or strand wires. The operation just described of the delivery plungers or fingers, the depressing or forcing down fingers and the coiler heads, will continue until the required amount of fencing has been completed, or until the machine is stopped. The same operation occurs when the coiler heads are stationary, the only difference being that the coiler heads are always in position to have forced into coiling position the overlapping ends of the stay sections, the longitudinal or strand wires having an intermittent advance instead of a continuous advance. The hoppers can be supplied with additional stay sections when the first supply is exhausted or nearly so; and the discharge of a stay section from a hopper is through gravity and occurs after the full withdrawal of the delivery plungers or fingers, so as to clear the mouth of the hopper and allow a stay section to drop upon the rests or supports in front of and in line with the receiving slot or recess of the plungers or fingers.

It will be understood that instead of having the hoppers arranged on opposite sides of the path of travel of the longitudinal or strand wires and the completed fence, the hoppers could be arranged on one side of the line of travel, in which case the stay sections would be delivered on the same side of the longitudinal or strand wires, instead of on opposite sides, but the operation of the various mechanisms will be substantially the same as described for the operation, when the hoppers and the delivery mechanism are located and operate on opposite sides of the line of travel; and it is also to be understood that while the elements entering into the various mechanisms have been described somewhat in detail, it is not the intention thereby to confine the construction to the specific arrangement shown and described, as modifications can be made in the construction and arrangement of the various parts, so long as the construction and operation of the delivery fingers and the depressing or forcing down fingers is one by which the stay sections will be taken from the point of deposit from the hoppers, delivered to the longitudinal or strand wires, and held in position for engagement by the coiler heads.

The delivery fingers or plungers 20, for use in connection with an endwise movable coiler head and a longitudinal or strand wire having a continuous forward feed, each have the point 21 connected with the main body of the finger or plunger by a hinge pivot 20$^a$, with a shoulder 21$^a$ below the hinge-pivot of the point to the body, which shoulders form a stop against down-dropping of the point. This construction is required for the reason that the coilers on the upward movement must receive the ends of the stay sections, which are forced down by the depressing fingers; and the ends of the stay sections must be held until the coilers have begun the initial coiling of the stay section ends around the longitudinal or strand wires. The depressing fingers act quickly after the delivery plungers or fingers have reached the end of their strokes; and if the delivery fingers or plungers were withdrawn before the depressing fingers crowded the ends of the stay section down to be held until the coilers engaged therewith, the body of the stay section would also go down into the coilers and the coiler pins or lugs would catch the body of the wire. After the ends of the stay wire sections are crowded down into the coilers, and the coilers have started to coil the ends of the stay sections around the strand wires and have made approximately a half turn, the body of each stay section begins to rise, carrying with it the pivoted point of the plunger, and this movement occurs at about the time the delivery fingers or plungers commence their receding movement; and the upward movement of the pivoted points of the delivery fingers or plungers continues until the fingers or plungers have been receded a sufficient distance to slip away from the stay wires. The pivot or hinge point of each delivery finger or plunger will drop by gravity to its normal position and be held horizontally by the engagement of the shoulders 21$^a$ of the point and the body of the finger or plunger. The finger or plunger, for use with a coiler or coiler head having no endwise movement, can have the body and point in a continuous piece, as shown in Fig. 20, as no upward movement of the coilers or coiler heads is had to interfere with the stay sections.

What I claim as new and desire to secure by Letters Patent is:

1. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, a slidable bar common to all of the plungers of the hoppers, a bell-crank lever at each end of the slidable bar, a connecting rod for each bell-crank lever, and means for moving the connecting rods and giving a reciprocating movement to the bar and reciprocating all the plungers in unison, substantially as described.

2. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, a slidable bar common to all of the plungers of the hoppers, a bell-crank lever at each end of the slidable bar, a connecting rod for each bell-crank lever, and a revoluble eccentric for each connecting rod for moving the connecting rods and giving a reciprocating movement to the bar and reciprocating all the plungers in unison, substantially as described.

3. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, a rest below and at each end of each hopper receiving thereonto a stay section from the hopper, a pin on the movable jaw of the plunger, a cam engaging the pin and opening the movable jaw at the limit of the return movement of the plunger, and means for giving a forward and backward reciprocating movement in unison to all of the plungers, substantially as described.

4. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, a rest below and at each end of each hopper receiving thereonto a stay section from the hopper, a pin on the movable jaw of the plunger, a cam engaging the pin and opening the movable jaw at the limit of the return movement of the plunger, a spring engaging and closing the movable jaw with the advance of the plunger after receiving a stay section, and means for giving a forward and backward reciprocating movement in unison to all of the plungers, substantially as described.

5. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, means for giving a forward and backward reciprocating movement in unison to all of the plungers, a series of depressing fingers, one finger for each strand wire, operating to force down the overlapping ends of the delivered stay sections into engaging position for the coilers, substantially as described.

6. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, means for giving a forward and backward reciprocating movement in unison to all of the plungers, a series of depressing fingers, one finger for each strand wire, operating to force down the overlapping ends of the delivered stay sections into engaging position for the coilers, and means for giving the depressing fingers a rocking movement for engaging and releasing the stay sections, substantially as described.

7. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, means for giving a forward and backward reciprocating movement in unison to all of the plungers, a series of depressing fingers, one finger for each strand wire, operating to force down the overlapping ends of the delivered stay sections into engaging position for the coilers, a rock-shaft common to all of the depressing fingers, and means for rocking the shaft and giving the depressing fingers a rocking movement for engaging and releasing the stay sections, substantially as described.

8. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, means for giving a forward and backward reciprocating movement in unison to all of the plungers, a series of depressing fingers, one finger for each strand wire, operating to force down the overlapping ends of the delivered stay sections into engaging position for the coilers, a rock-shaft common to all of the depressing fingers, cranks on the rock-shaft, a connecting rod for each crank, an oscillating lever for each connecting rod, and means for oscillating the lever, substantially as described.

9. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, means for giving a forward and backward reciprocating movement in unison to all of the plungers, a series of depressing fingers, one finger for each strand wire, operating to force down the overlapping ends of the delivered stay sections into engaging position for the coilers, a rock-shaft common to all of the depressing fingers, cranks on the rock-shaft, a connecting rod for each crank, an oscillating lever for each connecting rod, a roller at one end of the lever, and a revoluble cam engaging the roller, substantially as described.

10. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, means for giving a forward and backward reciprocating movement in unison to all of the plungers, and a series of coilers, one coiler for each strand wire and through which the strand wire passes for coiling the overlapping ends of the stay sections around the strand wires, substantially as described.

11. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, means for giving a forward and backward reciprocating movement in unison to all of the plungers, a series of depressing fingers, one finger for each strand wire, operating to force down the overlapping ends of the delivered stay sections into engaging position for the coilers, means for giving the depressing fingers a rocking movement for engaging and releasing the stay section, and a series of coilers, one coiler for each strand wire and through which the strand wire passes, for coiling the overlapping ends of the stay sections around the strand wires, substantially as described.

12. In a machine for making wire fence, the combination of a hopper adapted to receive sections of a transverse stay, a pair of horizontally reciprocating plungers for each hopper located below the discharge of the hopper, and each plunger having at its forward end a fixed jaw and a movable jaw, with a slot between the jaws for receiving and retaining the stay section, a rest below and at each end of the hopper receiving thereonto a stay section from the hopper, means for giving a forward and backward reciprocating movement in unison to both plungers, a depressing finger for each end of the stay section, and means for giving the depressing fingers a rocking movement for engaging and releasing the stay section, substantially as described.

13. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, means for giving a forward and backward reciprocating movement in unison to all of the plungers, a series of coilers, one coiler for each strand wire and through which the strand wire passes, for coiling the overlapping ends of the stay sections around the strand wires, a slidable bar common to all of the plungers of the hoppers, and means for reciprocating the bar and giving a forward and backward reciprocating movement in unison to all of the plungers, substantially as described.

14. In a machine for making wire fence, the combination of a hopper adapted to receive sections of a transverse stay, a pair of horizontally reciprocating plungers for each hopper located below the discharge of the hopper, and each plunger having at its forward end a fixed jaw and a movable jaw, with a slot between the jaws for receiving and retaining the stay section, a rest below and at each end of the hopper receiving thereonto a stay section from the hopper means for giving a forward and backward reciprocating movement in unison to both plungers, a depressing finger for each end of the stay section, means for giving the depressing fingers a rocking movement for engaging and releasing the stay section, and coilers for engaging and coiling the overlapping ends of the stay section around the strand wires, substantially as described.

15. In a machine for making wire fence, the combination of a plurality of hoppers arranged in rows on opposite sides of the path of travel of the strand wires, each hopper adapted to receive a stay section, a pair of horizontally reciprocating plungers for each hopper, each plunger having at its forward end a fixed jaw and a movable jaw, with a slot between the jaws for receiving and retaining the stay section and delivering alternate stay sections on opposite sides of the strand wires, and means for giving a forward and backward reciprocating movement in unison to both series of plungers, substantially as described.

16. In a machine for making wire fence, the combination of a plurality of hoppers arranged in rows on opposite sides of the path of travel of the strand wires, each hopper adapted to receive a stay section, a pair of horizontally reciprocating plungers for each hopper, each plunger having at its forward end a fixed jaw and a movable jaw, with a slot between the jaws for receiving and retaining the stay section and delivering alternate stay sections on opposite sides of the strand wires, a rest below and at each end of each hopper receiving thereonto a stay section from the hopper, and means for giving a forward and backward reciprocating movement in unison to both series of plungers, substantially as described.

17. In a machine for making wire fence, the combination of a plurality of hoppers arranged in rows on opposite sides of the path of travel of the strand wires, each hopper adapted to receive a stay section, a pair of horizontally reciprocating plungers for each hopper, each plunger having at its forward end a fixed jaw and a movable jaw, with a slot between the jaws for receiving and retaining the stay section and delivering alternate stay sections on opposite sides of the strand wires, a rest below and at each end of each hopper receiving thereonto a stay section from the hopper, and means for opening and closing the movable jaw of each plunger for receiving and retaining the stay section in the slot between the jaws, substantially as described.

18. In a machine for making wire fence, the combination of a plurality of hoppers arranged in rows on opposite sides of the path of travel of the strand wires, each hopper adapted to receive a stay section, a pair of horizontally reciprocating plungers for each hopper, each plunger having at its forward end a fixed jaw and a movable jaw, with a slot between the jaws for receiving and retaining the stay section and delivering alternate stay sections on opposite sides of the strand wires, means for giving a forward and backward reciprocating movement in unison to both series of plungers, a series of depressing fingers, one finger for each strand wire operating to force down the overlapping ends of the delivered stay sections into engaging position for the coilers, and means for giving the depressing fingers a rocking movement for engaging and releasing the stay sections, substantially as described.

19. In a machine for making wire fence, the combination of a plurality of hoppers arranged in rows on opposite sides of the path of travel of the strand wires, each hopper adapted to receive a stay section, a pair of horizontally reciprocating plungers for each hopper, each plunger having at its forward end a fixed jaw and a movable jaw, with a slot between the jaws for receiving and retaining the stay section and delivering alternate stay sections on opposite sides of the strand wires, means for giving a forward and backward reciprocating movement in unison to both series of plungers, a series of depressing fingers, one finger for each strand wire, operating to force down the overlapping ends of the delivered stay sections into engaging position for the coilers, means for giving the depressing fingers a rocking movement for engaging and releasing the stay sections, and a series of coilers, one coiler for each strand wire and through which the strand wire passes, for coiling the overlapping ends of the stay sections around the strand wires, substantially as described.

20. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay sections, means for giving a forward and backward reciprocating movement in unison to all of the plungers, and a series of endwise movable coilers, one coiler for each strand wire and through which the strand wire passes, for coiling the overlapping ends of the stay sections around the strand wires, substantially as described.

21. In a machine for making wire fence, the combination of a plurality of hoppers, each hopper adapted to receive stay sections, a pair of horizontally reciprocating plungers for each hopper, each plunger having at its forward end a fixed jaw and a movable jaw, with a slot between the jaws for receiving and retaining the stay section, means for giving a forward and backward reciprocating movement in unison to all of the plungers, a series of endwise movable coilers, one coiler for each strand wire and through which the strand wire passes, for coiling the overlapping ends of the stay sections around the strand wires, and means for giving the coilers an endwise reciprocating movement, substantially as described.

22. In a machine for making wire fence, the combination of a plurality of horizontally reciprocating plungers, each plunger having at its forward end a fixed jaw and a movable jaw, with a slot between the jaws for receiving and retaining a stay section, means for giving a forward and backward reciprocating movement in unison to all of the plungers, depressing fingers operating to force down the overlapping ends of the stay sections into engaging position for the coilers, and a series of coilers corresponding to the number of strand wires for engaging the ends of the delivered stay sections and coiling the ends around the strand wires, substantially as described.

JOSEPH M. DENNING.

Witnesses:
J. L. MATTSON,
NELLE TUTTLE.